United States Patent Office 3,092,512
Patented June 4, 1963

3,092,512
GRAFT COPOLYMER OF POLYMERIZABLE AMIDE AND NITROGENOUS CONDENSATION POLYMER, AND PROCESS FOR PREPARING SAME
Eugene Edward Magat and David Tanner, Wilmington, Del., assignors to E. I. du Pont de Nemours and Company, Wilmington, Del., a corporation of Delaware
Filed Oct. 13, 1958, Ser. No. 766,647
8 Claims. (Cl. 117—138.8)

This invention relates to a novel product produced from certain condensation polymers. More particularly it concerns a novel product comprising an organic compound chemically grafted to a shaped article produced from a synthetic linear nitrogenous condensation polymer.

Fibers spun from synthetic linear nitrogenous, condensation polymers, i.e., condensation polymers wherein nitrogen is an integral part of the polymer chain, have attained commercial success in the textile trade because of their high tenacity, wear resistance, impact resistance, attractive handle and the like. These fibers have also been recognized to have resistance to attack by various chemical reagents, and to have low moisture sensitivity. These latter properties have made such fibers difficult to dye to deep, wash-fast shades with conventional dyes. Similarly the low moisture regain has limited the acceptability of such fibers for certain apparel uses, such as, for example, certain types of undergarments. Attempts to modify the structure of these fibers by prior art methods to render them more readily dyeable and more hydrophilic have resulted in serious loss of many desirable fiber properties. For example, attempts to render these fibers more hydrophilic usually result in increasing their moisture sensitivity to such an extent that they lose their convenient wash-wear properties, since they lose their impressed creases and become wrinkled under conditions of high humidity.

OBJECTS

An object of the present invention is to provide a novel and useful shaped structure produced from a synthetic nitrogenous condensation polymer.

Another object is to provide a shaped structure produced from a synthetic nitrogenous condensation polymer retaining a high level of physical properties, and characterized by ready dyeability with a wide variety of dyestuffs.

A further object is to provide a highly wickable, hydrophilic shaped structure produced from a synthetic nitrogenous condensation polymer, but further characterized by a high degree of wet crease recovery.

A still further object is to provide a shaped structure of high oxidative stability and good light durability, the said structure being formed from a synthetic nitrogenous condensation polymer.

A further object is to provide a synthetic polymer yarn from which a true crepe may be woven.

These and other objects will become apparent in the course of the following specification and claims.

STATEMENT OF INVENTION

In accordance with the present invention a shaped structure is provided, the said structure being formed from a graft copolymer comprising (1) a high molecular weight, synthetic linear condensation polymer characterized by recurring amide notrogen interunit linkages as an integral part of the polymer chain, and (2) grafted thereto, from at least 4 to about 200 wt. percent (based on weight of the original condensation polymer) of carbonaceous side chains bearing amide groups, the said amide-bearing chains being chemically bonded by a carbon to carbon linkage to a catenarian carbon of the said condensation polymer, and the said amide groups so linked being at least one carbon atom removed from said catenarian carbon. The product of the present invention thus comprehends a linear polymer, to the trunk of which are attached a plurality of pendant carbonaceous side chains bearing amide groups which form branches attached to the main chain. The amide groups may be grafted to the condensation polymer by forming free radicals on suitable carbons in the chain of the condensation polymer, which free radicals then serve to initiate vinyl polymerization when contacted with a suitable vinyl amide monomer.

The free radicals may be generated on the polymer chain by exposure to high energy ionizing radiation before, during or after contact with the vinyl amide, or, alternatively, thermal treatment may be used, with or without a chemical initiator, to initiate the grafting reaction.

The grafted amide-bearing chains may be present only at or near the surface of the shaped polymeric article, but preferably these grafted chains will be distributed throughout the bulk of the shaped article. This bulk distribution is suitably accomplished by soaking the shaped polymer article in a solution of the vinyl amide until penetration has occurred, before initiating the polymerization reaction.

The free radicals which serve to initiate the grafting reaction upon the condensation polymer are conveniently produced by exposing the said shaped polymeric article, preferably in contact with the vinyl amide, to ionizing irradiation. Free radical formation and graft polymerization thereafter ensue. Alternatively, the grafting reaction can be induced by conventional chemical initiators, especially if care is taken that the vinyl monomer penetrate into the shaped substrate before grafting polymerization is initiated. Indeed, for readily graftable monomers such as, for example, N-vinylpyrrolidone, it may be unnecessary to add a chemical initiator, provided the substrate-monomer combination is heated to a sufficiently high temperature.

In some situations, for instance with sufficiently translucent substrates, the grafting can be initiated by exposure to ultraviolet light, preferably in the presence of a photoinitiator.

DEFINITIONS

By the expression "... condensation polymer characterized by recurring amide nitrogen interunit linkages as an integral part of the polymer chain" is meant a member of the class comprising polyamide, polyurethane, polyurea and polysulfonamide. The nitrogen linkages between the recurring units may be represented as wherein is a member of the class consisting of and and R is hydrogen, lower alkyl and lower alkyllene when the diamine has a ring structure, such as in the case of piperazine. High molecular weight fiber-forming polyamides, now well known as "nylon," are preferred in forming the product of this invention. Also included are those polymers with recurring main-chain links such as etc. The R substituents on the nitrogen are preferably hydrogen, but may be a monovalent radical, preferably hydrocarbon radical.

It has been pointed out that the presence of amide nitrogen as interunit linkages on the polymer chain is the feature which characterizes the polymers useful in forming the product of this invention. It is believed that the nitrogen atom in the radical activates nearby and especially the adjacent carbon-hydrogen groups so that hydrogen is readily abstracted by free-radical initiators, forming a free radical which thus becomes available for attachment of unsaturated amide, as explained hereinafter. It has been established that this class of polymers is more readily graftable (e.g., requires a smaller dose of radiation for specified weight gain) than a polymer of similar structure without the said amide interunit linkages. Thus, copolymers are included among the polymers suitable for forming the product of this invention, provided they contain at least about 1.0% by weight of amide interunit linkages as an integral part of the polymer chain.

The term "synthetic linear organic condensation polymer" is well understood; it refers to those polymers which are formed by condensation polymerization as well as those which on chemical degradation (e.g. hydrolysis) yield monomeric end products differing in composition from the structural units. (P. J. Flory, "Principles of Polymer Chemistry," Cornell University Press, Ithaca, New York 1953, pages 37–50.) These polymers usually have a repeating unit with structural formula different from the formula of the monomer, in contrast to addition polymers formed by addition via an unsaturated carbon-carbon bond. Again unlike addition polymers, a monomer can usually be obtained from a condensation polymer by hydrolysis. Although some condensation polymers may be prepared from certain monomeric derivatives whereby the elimination of simple molecules is not required, these are not exceptions to the defined class; in this case, the simple molecule has already in effect been eliminated from the monomer. Examples of such monomeric compounds are acid anhydrides, lactones and lactams. For example, a polyamide may be prepared from an amino carboxylic acid with the evolution of water molecules. On the other hand, the identical polymer may be prepared from the epsilon lactam derivative of that amino carboxylic acid, but in this case no water need be eliminated. The synthetic organic condensation polymers used to form the product of this invention are those which are primarily carbonaceous in character, i.e., have polymer chains which consist primarily of carbon-carbon bonds, interrupted periodically by other atoms such as nitrogen in the polymer chain.

By a "high molecular weight . . . polyamide" is intended a polymer, the recurring units of which are connected by linkages predominantly of the carbonamide structure, the said polymer having a molecular weight of such magnitude that it is fiber-forming and has a non-tacky surface at room temperature.

By "ionizing radiation" is meant radiation with sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 ev. and above is effective for the process of this invention. The ionizing radiation preferred for forming free radicals and initation grafting on the synthetic linear condensation polymer of this invention is high energy ionizing radiation, and has an energy equivalent to at least 0.1 million electron volts (mev.). Higher energies (10 to 15 mev.) are even more effective; the only known upper limit is imposed by available equipment. This radiation is generally classed in two types: high energy particle radiation, and high energy ionizing electromagnetic radition. The effect produced by these two types of radiation is similar, the essential requisite being that the incident particles or photons have sufficient energy to break chemical bonds and generate free radicals.

By "high energy particle radiation" is meant an emission of high energy electrons or nuclear particles such as protons, neutrons, alpha particles, deuterons, or the like, directed so that the said particle impinges upon the solid polymer bearing the unsaturated amide. The charged particles may be accelerated to high speeds by means of a suitable voltage gradient, using such devices as a resonant cavity accelerator, a Van de Graaff generator, a betatron, a synchrotron, cyclotron, or the like, as is well-known to those skilled in the art. Neutron radiation may be produced by bombardment of selected light metal (e.g., beryllium) targets with high energy positive particles. In addition, particle radiation suitable for carrying out the process of the invention may be obtained from an atomic pile or from radioactive isotopes or from other natural or artificial radioactive material.

By high energy "ionizing electromagnetic radiation" is meant radiation produced when a metal target (e.g., gold or tungsten) is bombarded by electrons possessing appropriate energy. Such energy is imparted to electrons by accelerating potentials in excess of 0.1 million electron volts (mev.), with 0.5 mev. and over preferred. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma rays. While gamma radiation is distinguished from X-radiation only with reference to its origin, it may be noted that the spectral dstribution of X-rays is different from that of gamma rays, the latter frequently being essentially monochromatic, which is never the case with X-rays produced by electron bombardment of a target.

Because of nylon's commercial importance and wide acceptance, the preparation and properties of the product of this invention will be illustrated primarily in terms of polyamide starting materials, which constitute a preferred polymer class for the product of this invention.

EXPERIMENTAL UNITS AND TECHNIQUES

The following examples are cited to illustrate the invention. They are not intended to limit it in any manner. Unless otherwise noted "66 nylon fabric" employed in the examples is a taffeta fabric, woven from 70 denier polyhexamethylene adipamide continuous filament yarn having a denier per filament of 2.0. The polyamide is produced from hexamethylene diamine and adipic acid (ergo "66"). The static propensity of the fabric is indicated in terms of direct current resistance in ohms per square measured parallel to the fabric surface, at 78° F. and (except where indicated otherwise) in a 50% relative humidity atmosphere. High values indicate a tendency to acquire and retain a charge and are reported as the logarithm to the base 10, being designated "log R." A meter suitable for this determination is described by Hayek and Chromey, American Dyestuff Reporter, 40, 225 (1951).

The irradiation is carried out using a Van de Graaff electron accelerator with an accelerating potential of 2 million electron volts (mev.) with a tube current of 250 to 290 microamperes. Samples to the irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available does per pass of one mrep. Radiation dosages may be given in units of "mrep." (millions of roentgen equivalents physical), a rep. being the amount of high energy particle radiation which results in an energy absorption of 83.8 ergs per gram of water or equivalent absorbing material. Alternatively, dosages may be indicated in terms of exposure in watt-sec./cm.$^2$.

Doses of X-radiation are given in units of "mr." (millions of roentgen), as is conventional. A roentgen is that amount of electromagnetic radiation which when absorbed in 1 cc. of dry air at standard temperature and pressure will produce 1 electrostatic unit of charge of either sign.

Crease recovery is evaluated by crumpling a fabric in the hand, and observing the rate at which it recovers from this treatment. Wet crease recovery indicates the rate at which creases disappear from the crumpled fabric when it is wetted. Numerical values are obtained using the Monsanto crease recovery method, described as the "Vertical Strip Crease Recovery Test" in the American Society for Testing Materials Manual as Test No. D1295-53T. In determining wet crease recovery by this method, the specimens are soaked for over 16 hours in distilled water containing 0.5% (by weight) of "Tween 20," a polyoxyalkylene derivative of sorbitan monolaurate. Immediately prior to testing, excess water is removed from the test fabrics by blotting between layers of a paper towel. Results are reported as percent recovery from a standard crease in 300 seconds.

*Example 1*

A sample of "66" nylon fabric is immersed in a solution of 10 parts by weight acrylamide and 90 parts by weight water. Excess liquid is squeezed out and the moist fabric is wrapped in aluminum foil and stored at room temperature for about 96 hours. While still wet and wrapped it is thereafter irradiated using the Van de Graaff electron accelerator, operated as described above, to a total dose of 40 mrep. After 15 standard washings, the dried fabric of the present invention retains a much stiffer hand than an uncoated, irradiated comparative control. Furthermore, the acrylamide-grafted nylon is more hydrophilic than nongrafted control samples and has a significantly higher wickability. Thus when samples of the acrylamide-grafted fabric of Example 1 are boiled for 30 minutes in a bath having the composition (based on a fabric weight of 1 gram):

50 ml. water
0.1 gram of Perlon Fast Red 3 BS [1]
0.02 gram Triton X-100 [2]
0.02 gram of ammonium hydroxide

[1] The cobalt dye of Example 3 of German Patent 743,155 (1943).
[2] Octyl phenyl polyether alcohol.

the acrylamide-grafted nylon dyes rapidly to a deep shade whereas neither the original nylon nor irradiated (40 mrep.) nylon can be dyed effectively under the same conditions using this bath.

*Example 2*

A sample of "66" nylon fabric is immersed in a solution of 30 parts of acrylamide and 70 parts water. The fabric sample is squeezed to eliminate excess liquid and is then wrapped in aluminum foil forming a flat package. The sample is exposed to X-irradiation using a resonant transformer X-ray machine known as a "two million volt mobile X-ray unit." This machine is described by E. E. Charlton and W. F. Westendorf in the proceedings of the First National Electronics Conference, page 425, October 1944. The sample is placed in an open-top box made from 1/16 inch sheet lead, and positioned so that the sample is 8 cm. from the tungsten tube target. At this location, using a tube voltage of 2 mev., and a tube current of 1.5 milliamperes, the irradiation rate is 1.5 mr. per hour. The beam irradiates a circle about 3 inches in diameter; all fabric tests are made on the irradiated portion. The dose employed for the instant sample is a total of 27 mr. The sample is then given 15 washings, each of which consists of a 30-minute immersion in 18 liters of 70° C. water contained in a 20-liter agitation washer. The wash solution contains 0.5% of a detergent sold under the trademark "Tide" containing in addition to sodium phosphates, sodium lauryl sulfate and alkyl alcohol sulfate detergents. Following the washings, the dried fabric of the present invention is found to have shrunk 20%, and to have acquired a dry hand and a delustered appearance as compared to an untreated, irradiated comparative control. The treated sample is also more resilient and lively than before the treatment.

*Example 3*

This example shows the effect of treating variables such as solution composition, padding ratio, and irradiation dose, in producing the graft copolymer of this invention. In preparing the samples of this example, portions of nylon fabric are soaked in the indicated solution of N-vinylpyrrolidone which was fractionally distilled in a nitrogen atmosphere under reduced pressure, prior to use. The samples are soaked individually in sealed polyethylene bags containing 80 ml. of the treating solution for each 7 x 9 inch nylon fabric sample. The soaking time is 10 hours at room temperature. The bags are then irradiated (as in Example 1) at room temperature for one pass under the electron beam, to give the indicated dose of 1 mrep. After a hold-up time of about 1 hour, in order to be sure that the graft polymerization reaction is completed, the fabric samples are removed and non-grafted homopolymer is removed by rinsing thoroughly in hot distilled water (80° C.). After rinsing, the fabrics are boiled for 30 minutes at 120° C. in a pressure cooker and dried. The weight gains are then determined. The results of these tests are then given in Table 1. Weight gains are given in terms of weight percentage of N-vinylpyrrolidone, based on the original weight of nylon sample.

TABLE 1.—EFFECT OF TREATING CONDITIONS

| Sample | Treating solution, wt. percent N-Vinyl-pyrrolidone | Padding [1] ratio | Radiation dose, mrep. | Wt. percent N-Vinyl-pyrrolidone (based on nylon) |
|---|---|---|---|---|
| AA | 2 | 30:1 | 1 | 2.5 |
| AB | 10 | 30:1 | 1 | 17.3 |
| AC | 20 | 30:1 | 1 | 36.6 |
| AD | 24 | 30:1 | 1 | 42.2 |
| AE | 60 | 30.1 | 1 | 45.2 |
| AF | 100 | 30:1 | 1 | 0.0 |
| AG | 20 | 1:1 | 2 | 18.1 |
| AH | 20 | 30:1 | 4 | 33.5 |

[1] Padding ratio = wt. of treating solution ÷ wt. of fabric.

Figure 2:
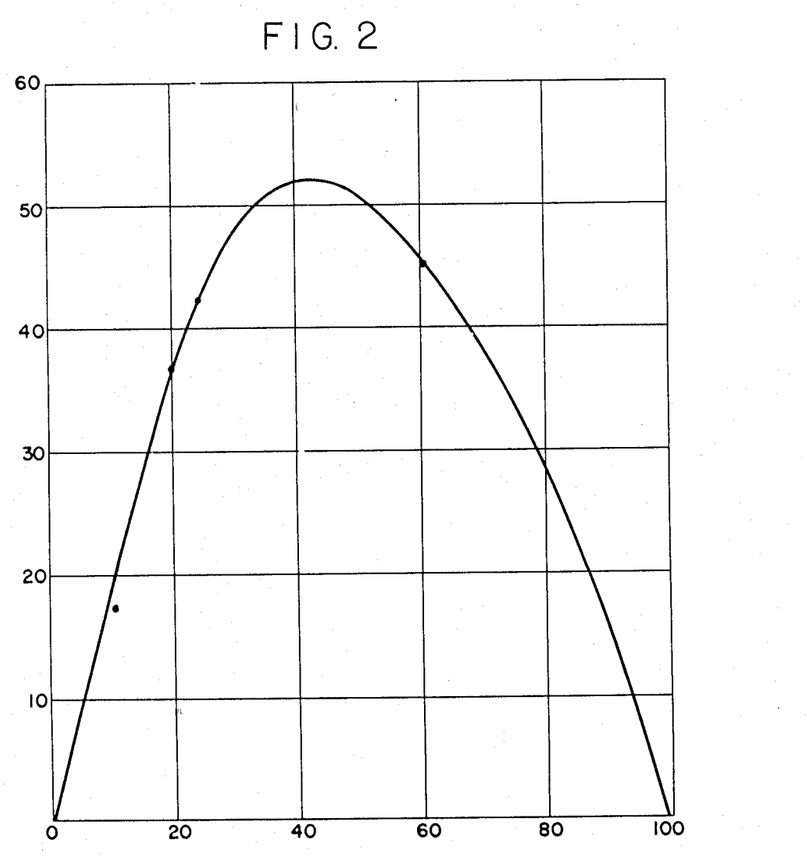
FIGURE 2 illustrates the relation existing between the concentration of N-vinylpyrrolidone as abscissa in an aqueous treating solution, and the fabric weight gain obtained as ordinate, at constant radiation dose. The data for this figure are presented in Example 3.

The data show that the pressure of some water is very effective in improving the efficiency of grafting of N-vinylpyrrolidone to nylon substrate. The results of this test are plotted in FIGURE 2, showing the relation between concentration of treating solution and the weight gain obtained.

When the test is repeated, using 100% N-vinylpyrrolidone but increasing the irradiation dose, the results shown in Table 2 are obtained. The results of Table 2 show that by the use of high irradiation exposures, it is possible to graft large amounts of N-vinylpyrrolidone to nylon substrates, even in the substantial absence of water. In contrast, samples AM to AO are included in Table 2 to show the improvement obtained by using a 50% aqueous solution.

TABLE 2

| Sample | Treating solution, weight percent N-vinyl-pyrrolidone | Radiation dose, mrep. | Wt. gain, percent |
|---|---|---|---|
| AI | 100% | 2 | 0.1 |
| AJ | 100% | 5 | 1.0 |
| AK | 100% | 10 | 5.0 |
| AL | 100% | 40 | 63.0 |
| AM | 50%, aqueous | 2 | 44.0 |
| AN | 50%, aqueous | 5 | 60.1 |
| AO | 50%, aqueous | 10 | 68.2 |

*Example 4*

This example illustrates some of the property improvements shown by the products of this invention.

Samples are prepared following the techniques of Example 3, whereby nylon fabrics BB and BC (see Table 3) are prepared having 22% and 42% N-vinylpyrrolidone grafts respectively. An untreated non-irradiated control (BA) is included for comparison. The moisture regain, wickability, and wet crease recovery (300 seconds) are measured and listed in Table 4.

TABLE 3.—POLYAMIDE WITH GRAFTED N-VINYLPYRROLIDONE (NVP)

| Sample | Aq. conc. NVP, percent | Irrad. dose, mrep. | percent NVP |
|---|---|---|---|
| BA (Control) | 0 | 0 | 0 |
| BB | 12 | 1 | 22 |
| BC | 24 | 1 | 42 |

TABLE 4

| Sample | Moisture regain, at 74° F. | | | Wickability | Percent wet crease recovery (after boil-off) |
|---|---|---|---|---|---|
| | 30% RH | 72% RH | 100% RH | | |
| BA | 1.6 | 4.4 | 8.0 | Poor | 68 |
| BB | 3.2 | 9.2 | 18.4 | Fair | 60 |
| BC | 4.3 | 12.1 | 27.4 | Good | 91 |

The wickability of the samples is determined by placing a small drop of water upon the sample and noting the time required for it to spread out and disappear. With a sample showing good wickability, the drop of water disappears almost instantly.

The product of this invention also has a high resistance to oxidation, as shown by improved strength retention during bleaching, and improved resistance to light degradation, as compared to unmodified 66 nylon.

Portions of samples BA, BB and BC are bleached in a sodium chlorite solution at 70° C. for 2 hours. The three fabric samples are rinsed thoroughly in tap water following the bleaching, and dried. The tensile properties of filaments removed from the fabrics are determined, with the results shown in Table 5.

The sodium chlorite bleach bath composition is as follows (based on 1 gram of fabric):

| Tap water | Sodium chlorite, grams | Glacial acetic acid, grams |
|---|---|---|
| 50 ml | 0.05 | 0.13 |

The bleaching test is repeated with fresh portions of BA, BB and BC, using a peracetic acid bleach. The bleaching is carried out with mild stirring at 70° C. for one hour.

The bleach bath composition, based on 1 gram of fabric, is as follows:

| Tap water | 40% aqueous peracetic acid, grams | Sodium hexametaphosphate, grams | Emulphor ON, grams |
|---|---|---|---|
| 50 ml | 0.2 | 0.03 | 0.03 |

Emulphor ON is a polyethylene ether of a fatty alcohol, and serves as a dispersing and wetting agent. The tenacity loss of yarns removed from the peracetic acid bleached fabrics are also listed in Table 5.

TABLE 5.—IMPROVED OXIDATIVE STABILITY OF N-VINYLPYRROLIDONE-MODIFIED NYLON AGAINST BLEACHES [1]

[Percent tenacity loss after standard bleachings]

| Sample | Sodium chlorite | Peracetic acid |
|---|---|---|
| BA | 25.5 | 29.4 |
| BB | 2.7 | 13.2 |
| BC | 16.0 | 3.6 |

[1] All fabrics, controls included, were subjected to a boil-off at 120° C. in a pressure cooker for 30 minutes, prior to bleaching.

It is also observed that the N-vinylpyrrolidone-grafted fabrics are readily bleached using sodium hypochlorite solution, a commonly used home bleaching agent. It is unnecessary to add acetic acid for effective bleaching, thus avoiding fabric strength loss. In contrast, unmodified nylon is not adequately bleached using sodium hypochlorite solution.

Yarns from fabrics samples BA, BB and BC are exposed to ultraviolet light in the weatherometer for 200 hours after which time they are tested to determine the percent tenacity retention and percent elongation loss. The results of these determinations are given in Table 6, and show the improved resistance to degradation shown by the product of the present invention.

TABLE 6.—LIGHT DURABILITY

[Weatherometer exposure, 200 hrs.]

| Sample | Percent tenacity loss 200 hrs. | Percent elongation loss |
|---|---|---|
| BA | 60 | 46 |
| BB | 59 | 38 |
| BC | 20 | (2% gain) |

Figure 1:
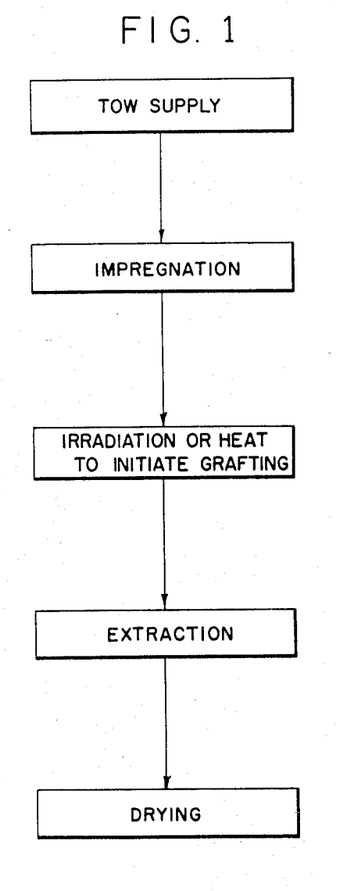
FIGURE 1 shows schematically process steps for preparing the novel product of this invention.

The procedure of this example is repeated in a continuous process, as shown in the flow sheet, FIGURE 1. Multifilament drawn nylon tow is continuously padded with aqueous N-vinylpyrrolidone, which is continuously carried through the beam of 2 mev. electrons at such a rate that a dose of 2 merp. is obtained.

The amide-grafted tow next passes through a washing step, using 80° C. distilled water, to remove excess monomer and ungrafted polyvinylpyrrolidone, followed by drying. Following conventional procedures, the dried tow is crimped, cut to 1½ inch staple length, and spun to yarn on the cotton system. Fabric woven from this yarn has substantially the same properties as obtained by grafting directly to the fabric.

The ready dyeability of the product of this invention is shown by the following example:

*Example 5*

Nylon fabrics coded CB and CC are prepared following the techniques of Example 3, to have 12% and 42% respectively of grafted N-vinylpyrrolidone. These samples, along with unmodified control CA, are subjected to a series of dyeing tests designed to illustrate the advantages of the product of this invention.

*Rate of dyeing.*—Three dye baths are prepared containing 10% Cibalan Black BGL, a metallized azo dye (Haynes, "Chemical Trade Names and Commercial Synonyms," p. 124, Van Nostrand, 1955), and dyebaths are adjusted to a pH of 5 with acetic acid. The three fabrics are placed in their respective baths, and dyed at the boil for 1 minute, are then removed, rinsed thoroughly in soft water and dried. An estimation of the dye depth, as a measure of rate of dyeing, is given in Table 7.

TABLE 7.—RATE OF DYEING

| Sample: | Dye depth |
|---|---|
| CA (control) | 1.5 |
| CB | 4.0 |
| CC | 10.0 |

Sample CC, with the highest loading of grafted N-vinylpyrrolidone, dyed most rapidly, and is given the rating of 10.0. CB dyed at a slower rate, and the unmodified control CA was the slowest of all.

*Saturation dyeing.*—Cold aqueous baths are made up containing 3% dye (Color Index No. 430), and 10% ammonium sulfate. The fabrics are added to the respective dyebaths, the bath temperature is raised to the boil slowly and dyeing is continued for ½ hour. Thereafter, over a period of 10 minutes, 3% glacial acetic acid is added and boiling is continued for 20 minutes longer. Next, 3% formic acid is added and boiling is continued for another hour. The fabrics are then rinsed and dried. An evaluation of the depth of color relative to the control sample CA is given in Table 8.

TABLE 8

| Sample: | Depth of shade Compared to CA [1] |
|---|---|
| CA | -- |
| CB | 6 |
| CC | 8 |

[1] Based on a rating of "10" as optimum depth of color.

In addition to the deeper dyeing, the N-vinyl-pyrrolidone-grafted fabric showed a greater exhaust efficiency.

*Color build-up with various classes of dyes.*—A series of dyebaths are prepared with representative dyes from four different classes. Dyebath compositions are listed below, as well as the dyeing procedure used. The results of the dyeing tests are given in Table 9. It is apparent that in every case, the test fabrics bearing grafted amide dyed more rapidly to darker shades than the unmodified nylon control. Results are expressed in terms of the ratings of Table 8.

TABLE 9

| Sample | Acid (a) | Chromo (b) | Vat (c) | "Perlon" (d) |
|---|---|---|---|---|
| CA | 1 | 1 | 1 | 1 |
| CB | 4 | 6 | 8 | 6 |
| CC | 10 | 10 | 10 | 10 |

In addition, it is noted that with dyes of "Perlon" class (described in Example 1), there was less staining of effect fibers (such as acetate, cotton, nylon, viscose, silk or wool) with samples CC and CB than with the control, CA. Dye bath compositions reported below are percentage by weight based on total dyebath weight.

Acid dye bath (*a*) is 1% Anthraquinone Green GN (Color Index No. 1078) and 10% ammonium sulfate. Fabrics are added and the temperature raised to the boil slowly and maintained for ½ hour. Acetic acid (3%) is added to the exhaust, and the fabrics are rinsed and dried. The total dyeing time at the boil is 1.5 hours.

Chrome dye bath (*b*) contains 1% ethylene oxide propylene oxide condensation product, 10% ammonium sulfate, and 6% Pontachrome Blue Black RM (Color Index No. 1184). The fabric is added and the temperature of the bath raised slowly to the boil. Dyeing at the boil is maintained for 30 minutes, after which 2% acetic acid is added, and boiling is maintained an additional 30 minutes. Thereafter 4% formic acid is added and boiling is continued for 30 minutes. The fabrics are topchromed in a fresh bath for 1 hour at the boil with 1.5% sodium dichromate and 3% formic acid. Samples are then rinsed, dried and examined.

Vat dye bath (*c*) contains 5% "Sulfanthrene" Blue 2B double paste (Color Index No. 1184) and 1% alkylaryl sodium sulfonate. The fabrics are dyed at 82° C. for 20 minutes, then the bath is cooled to reducing temperature and caustic soda and sodium hydrosulfite are added. Dyeing is continued for 30 minutes. The fabrics are then rinsed and oxidized with sodium perborate at 50° C. for 10 minutes with an alkyl polyoxyethylene sulfate detergent. The samples are rinsed, dried and examined.

The "Perlon" dyebath (*d*) and dyeing procedure is the same as that under (*a*) above, except that 1% of "Perlon" Fast Red 3 BS (as identified in Example 1) replaces the green dye.

It is also to be noted that the dyed fabrics prepared from nitrogenous condensation polymer with grafted amide show a significant improvement in dye uniformity and freedom from streaks, as compared to an unmodified control.

The degree of improvement appeared to correlate with the amount of unsaturated amide grafted. Very satisfactory results were obtained with 30 to 40% of N-vinylpyrrolidone.

The ease with which the product of this invention is dyed becomes under some circumstances a disadvantage. For example, when the fabric of this invention is laundered with color materials, there is a tendency for dye transfer to occur whereby the lighter colored fabrics become stained. It has been found that when certain co-grafts are attached to the condensation polymer substrate, it resists dye transfer. With a suitable choice of monomers, modifications can be produced that combine the most desirable properties attained by each of the two monomer species.

*Example 6*

A portion of nylon taffeta fabric (7 x 9 inches) prepared from 70 denier 34 filament nylon yarn is placed in a one-gallon polyethylene bag with 30 ml. of N-vinylpyrrolidone, 30 grams of purified sodium styrene sulfonate, and 120 ml. of 15% aqueous sodium sulfate solution. The air bubbles are removed as completely as possible and the polyethylene bag is sealed. The bag is then heated in a water bath at 60° C. for 15 minutes and irradiated for a dose of 1 mrep. at that temperature. The samples are allowed to remain in contact with the solution for ½ hour before removing from the bag. Thereafter the sample is washed 4 times in distilled water at 80° C. and a weight gain of 28.1% is observed. The The log R of a portion of this fabric after being boiled in 0.5% sodium carbonate solution, rinsed, and then dried, is determined to be 8.0. The log R of another portion of the sample, boiled in 1% calcium acetate solution, followed by rinsing and drying, is found to be 10.5. The sodium and calcium treated samples are found to have a wet crease recovery of 100% and 90% respectively. Sulfur analyses on the fabrics indicate that about 15% of sodium styrene sulfonate is grafted, and about 10% of N-vinylpyrrolidone.

When a portion of the fabric of this example is boiled with swatches of unmodified nylon dyed with dispersed or acid dyes, much less color pickup (dye transfer) is noted, compared with a control nylon fabric to which N-vinylpyrrolidone is grafted.

Example 7

A switch of nylon fabric is heated at 60° C. for 10 to 15 minutes in a solution containing 15 grams of acrylamide, 60 grams of purified sodium styrene sulfonate, 45 grams of sodium sulfate and 180 ml. of water. The fabric is irradiated while immersed in the solution at 60° C., with an irradiation dose of 1 mrep., and is allowed to remain in the solution for ½ hour after the irradiation. After washing, the weight grain is 3.6%. A portion of the fabric is boiled in dilute (0.5%) sodium hydroxide solution, thus forming the sodium salt of the styrene sulfonic acid, which portion is then rinsed and the log $R$ determined. The log $R$ is found to be 7.5 at a relative humidity of 55%. When another portion of the same fabric is boiled in dilute calcium acetate, the log $R$ is 11.6. Both values indicate a low static propensity. The fabrics are highly wickable in both the sodium and calcium forms. The rate of dyeing and depth of shade are greater for the nylon containing the co-graft as compared with a control of unmodified nylon using either acid dyes or the dye disclosed in Example 1.

Example 8

The product of this invention may be suitably and advantageously prepared from copolymers containing other active groups. A fabric is prepared from a copolymer predominantly of 66 nylon, but wherein a portion of the adipic acid component is replaced by 3.7 mol percent of sulfonated-isophthalic acid. This copolymer fabric is soaked in a 24% aqueous solution of N-vinylpyrrolidone for 5 hours at 50° C. and is irradiated in an excess of this solution for a dose of 1 mrep. After washing in water, the weight gain due to grafted N-vinylpyrrolidone is 12.1%. When the procedure is repeated, but the dose is 2 mrep., the total weight gain is 44.8%. When the dye transfer of this latter fabric is tested, it is found to be markedly reduced as compared to a 42% graft of N-vinylpyrrolidone on 66 nylon.

The amide-grafted nitrogenous condensation polymer of the present invention can be prepared by grafting the vinyl amide to polymer flake, which is thereafter melted and spun to form a yarn. This embodiment of the invention is described in the following example.

Example 9

Nylon (66) polymer flake is cut to a particle size of 60 to 80 mesh, and is then soaked for 24 hours in a 50% aqueous solution of N-vinylpyrrolidone at room temperature. The soaked flake plus excess treating liquid is then irradiated to a total dose of one mrep., after which the flake is extracted with water to remove surface homopolymer. The amide-grafted flake is then charged to a melt-spinning machine and extruded to form filaments. Spinning equipment used for conventional 66-nylon polymer is suitable, such as that disclosed in United States Patent No. 2,217,743 to Greenewalt. A yarn of 13 filaments is extruded, quenched, an wound up on a package. Due to the high moisture regain of the amide-grafted polyamide, it is unnecessary to steam the yarn prior to wind-in, as taught by Babcock in United States Patent No. 2,289,860. The spun yarn is then conventionally cold drawn producing a 40-denier yarn. The said yarn is woven into fabric and dyed, following the procedures described hereinabove. The fabric produced by melt-spinning the grafted flake is equivalent to the product produced by treating the fabric.

When the test is repeated, using a copolymer flake of 20 parts polyhexamethylene adipamide and 80 parts polycaproamide, and soaking the flake for 16 hours at 50° C. in 40% aqueous N-vinylpyrrolidone solution, followed by irradiation as before, a weight gain of 69% is observed. This flake is melted and spun into yarn with satisfactory results.

The product of this invention may also be prepared by grafting induced by chemical initiators, as shown by the following example.

Example 10

A skein of drawn nylon yarn is extracted with $CCl_4$, to remove spin finish, followed by washing with distilled water. The skein is then soaked in 30% aqueous formic acid to pre-swell the filaments. The swollen filaments are rinsed in distilled water, and are then immersed in a vinyl amide solution of the following composition:

12 parts methacrylamide
3 parts acrylamide
0.05 part $\alpha,\alpha'$-azo-diisobutyramidine hydrochloride
35 parts of water The skein of yarn soaked in the above solution ½ hour at room temperature is heated for 2 hours at 70° C. After washing to remove surface polymer and drying, the weight gain of the skein is found to be 43.7%. The amide-grafting treatment caused the yarn to shrink 28%. The treated yarn thereafter is drawn 26%, thus returning substantially to its original length. A portion of the grafted yarn is observed to have a moisture regain of 23.2%, at 97% relative humidity as compared to 8.8% for an untreated 66 nylon control. When the grafted yarn is dyed with a vat dye, it acquires a much deeper color than does the untreated control. Moreover, the dyed yarn is stable to 100 hours exposure in a Fadometer, while the control is badly deteriorated in 20 hours. When dyed with acid colors, the color is produced much more rapidly than with the untreated control. Equivalent results are obtained using ammonium persulfate initiator.

The following example illustrates the formation of the amide-graft copolymer of this invention, wherein the unsaturated amide bears other functional groups whereby improved fabric properties are obtained.

Example 11

A portion of 66 nylon fabric is soaked for about 30 minutes in a bath containing 20 parts of N-methylolacrylamide and 80 parts of water. The fabric is then removed, squeezed between rubber rolls, resoaked for a second 30-minute period, squeezed again and dried. The dried fabric is sealed in a polyethylene bag, exposed to electron irradiation at room temperature, to a total dose of 2 mrep., following the procedure of Example 1, rinsed several times in distilled water to remove excess homopolymer. and is then washed in 50° C. water for 30 minutes. A weight gain of 7.0% is observed. The nylon fabric with the amide grafted thereto is thereafter soaked in a 1% aqueous solution of tartaric acid, squeezed to remove excess liquid, dried in air, cured at 160° C. for 5 minutes, and then rinsed well in distilled water. The final product is noticeably more resilient than the control and has a softening range and a resistance to hole melting such that when hot ashes from a burning cigarette are scattered upon it, only slight staining occurs. The irradiated control (i.e. no vinyl amide) develops holes immediately on being sprinkled with hot cigarette ash. In addition, the amide-graft, acid-cross-linked polyamide is insoluble in 88% formic acid, unlike normal 66 nylon.

The product of this invention may be prepared using a polyether-urethane polymer for the substrate, to which is grafted the unsaturated amide modifier, as illustrated by the following example. In this example, strengths of the sheets of paper-like product are determined by depositing the fibers on 100-mesh screen, washing the sheets obtained with approximately 6 liters of water and immediately rolling them off the screen by the couching technique familiar to the paper industry. The sheet is then dried at 120° C. (or, if necesary, at a temperature below the fusion temperature of the polymer), for 2 hours. After cooling, ½ inch strips are cut from the sheet and dry tensile strength measured on an Instron tester. Tongue tear strength is determined in accordance with ASTM D-39.

Example 12

The poly(ether-urethane) used in this example is prepared by reacting 124.5 grams (0.12 mol) of poly(tetramethylene oxide) glycol (molecular weight of 1,035) with 10.50 grams (0.06 mol) of 4-methyl-m-phenylene diisocyanate, with stirring in an anhydrous atmosphere for 3 hours at steam bath temperatures. To this "dimer" with hydroxyl ends is added, without cooling, 30.0 grams (0.12 mol) of methylene bis(4-phenylisocyanate) dissolved in dry methylene chloride and the mixture is maintained at steam bath temperature for one hour. The isocyanate terminated "dimer" so formed is cooled and 400 grams of N,N-dimethylformamide is added, followed by 3.0 grams (0.06 mol) of hydrazine hydrate dissolved in 26 grams of N,N-dimethylformamide. The resulting polymer solution contains 28% solids.

The polymer solution produced as described above is diluted to approximately 10% solids content, and 100 grams is placed in a separatory funnel from which it is allowed to trickle slowly into a 1-quart Waring Blendor containing approximately 400 ml. of glycerol, and operating at 14,000 r.p.m.

As a result of adding the polymer solution to the precipitant in this way, a mass of fibrous material is produced as described and claimed in United States patent application Serial No. 635,876, filed January 23, 1957, now abandoned. The component fibers of the mass have been termed fibrids, and will be thusly referred to hereinafter.

The fibrids are deposited on a 100-mesh screen to form a sheet, which is then washed three times with distilled water. The sheet is then removed and dried, as described hereinabove.

A portion of the above sheet, weighing 5.5 grams is soaked for 1 hour at room temperature in a polyethylene bag containing 30 grams of acrylamide and 120 ml. of water, and is then irradiated for a dosage of 1 mrep., using a Van de Graaff electron accelerator. The sample is washed at 80° C. in distilled water, and after drying the weight gain is 14.4%. The tear strength of the sheet product containing the graft is 0.103 lb./oz./yd.$^2$ as compared to 0.087 for control, an increase of 18%. The hand of the test sample is also slightly drier than control.

Example 13

A fabric prepared from filaments spun from the polyamide derived from metaphenylenediamine and isophthalic acid is soaked overnight in 30 ml. of 100% N-vinylpyrrolidone at room temperature. Five ml. of water is then added, and after 5 minutes the excess solution is removed by decantation. The wetted fabric is heated for 20 minutes at 85–90° C., followed by irradiation at this temperature, using the Van de Graaff electron accelerator for a total irradiation dose of 30 mrep. Two hours after the irradiation, the fabric is thoroughly scoured in hot water containing a small amount of synthetic detergent. After rising in water and drying, the fabric shows a weight gain of 20.6% and has a log R of 12.3, as compared to a value of over 13.3 for the unmodified original material. When the fabric is dyed with the red dyestuff of Example 1, it shows increased dyeability over the unmodified control.

The product of the present invention is useful in preparing a germicidal or bactericidal product, as illustrated by the following example.

Example 14

A sample of nylon fabric is prepared following the teachings of Example 3, so that a 45% graft of N-vinylpyrrolidone on the nylon is prepared. This fabric is boiled for 30 minutes in a 1% solution of iodine in methanol, followed by a 5-minute rinse in methanol. A weight gain of 8% is noted, due to the formation of an iodine complex with a grafted N-vinylpyrrolidone. Three portions of this fabric are then placed in contact with growing colonies of two fungii, *Chaetomium globosum* and *Aspergillus niger*, and 1 bacterium, *Micrococcus pyogenes* var. *aureus*. A significant zone of growth inhibition is noted with all three samples. The growth inhibition was significantly greater than that obtained with an original 66 nylon fabric which had been merely treated with the methanolic iodine solution.

Example 15

A swatch of nylon fabric is soaked in a solution of aqueous polyvinyl pyrrolidone for a period of 4 days at room temperature. The sample is then removed, excess treating solution squeezed out, and it is then wrapped in aluminum foil. The sample is irradiated with electrons using a 1 mev. resonant transformer, operated at a beam-out current of 560 microamperes. The sample is irradiated to a total dose of 40 mrep. Following the irradiation, the sample is held for several days in contact with excess treating solution, and is then given a standard wash. The sample is found to have the same antistatic properties as cotton, as measured by the rate at which a standard static charge leaks away. A similarly irradiated control, which had not been treated with the polyvinyl pyrrolidone, showed a high retention of static charge.

The irradiation-grafted sample is then dyed, using the dye and the dyeing procedure of Example 1. The rate of color buildup is much greater than that of unmodified irradiated control. Cross-sections of the dyed filaments show that the dye has penetrated uniformly throughout the fiber, indicating that the polyvinyl pyrrolidone had penetrated into the fiber before grafting, producing a bulk modification.

Similar improvement is noted when a disperse dye is used.

Example 16

A swatch of nylon taffeta fabric is padded with a solution consisting of 1.6 parts by weight of benzoin methylether and 100 parts by weight of methyl alcohol followed by air drying. The swatch is then padded with 50% aqueous N-vinylpyrrolidone, placed in a polyethylene bag, and after soaking for 60 minutes, is irradiated with ultraviolet light, using a medium pressure mercury arc lamp, positioned 10 cm. from the fabric. The lamp is equipped with a reflector, so that substantially all of the irradiation falls upon the fabric. An exposure time of 15 minutes is employed, and the estimated exposure is 18 watt-sec./cm.$^2$ of fabric. The fabric swatch is then rinsed in water, in methanol and then again in water, followed by scouring in water containing 0.1% sodium hydroxide and 0.1% of the sodium salt of lauryl alcohol sulfate. After air drying, the weight gain is found to be 6.4%. When the test is repeated, substituting an aqueous solution containing 46% N-vinylpyrrolidone and 9% sodium styrene sulfonate for the 50% aqueous N-vinylpyrrolidone, a weight gain of 4.3% is observed.

Example 17

Nylon taffeta samples 6" x 6" square are padded with a solution (as indicated in Table 10), wrapped in aluminum foil and irradiated with 2 mev. electrons, to the indicated dose. Following the irradiation, excess monomer and non-grafted homopolymer are removed by a "Tide" wash. The observed weight gain is shown in Table 10.

TABLE 10.—SAMPLE PREPARATION

| Sample No. | Treating monomer | Dose, mrep. | Wt. gain, percent |
|---|---|---|---|
| DA (Control) | none | 40 | none |
| DB | 1 ml. 50% aq. N-methyl, N-vinyl formamide. | 40 | 83 |
| DC | 1 ml. 100% N-methyl, N-vinyl formamide. | 40 | 49 |

The samples are then tested for wet crease recovery and dyeability, with the results shown in Table 11.

TABLE 11.—SAMPLE TESTING

| Sample No. | Wet crease recovery | Dyeability [1] | |
|---|---|---|---|
| | | Rate | Washfastness |
| DA | poor | fair | fair. |
| DB | fair | excellent | excellent. |
| DC | excellent | do | Do. |

[1] Dyeability determined using the dye and dyeing procedure of Example 1.

Example 18

A swatch of nylon taffeta is soaked in a solution containing 15 parts acrylamide, 42.5 parts methanol and 42.5 parts water, for 1 hour at 50° C. Excess liquid is squeezed from the sample, which is then sealed in a polyethylene bag and irradiated to a dose of 4 mrep. Ungrafted homopolymer is removed by thorough rinsing in water at 50° C.; a weight gain of 15% is observed. The fabric is immersed in a solution consisting of 500 parts water, 60 parts aqueous formaldehyde (37%) and 6 parts potassium carbonate. The fabric is heated in the solution for 2 hours at 60 to 70° C., rinsed in cold water, then agitated in 3% aqueous ammonium chloride solution at room temperature, followed by air drying. The treated fabric is placed on a pin tenter frame and heated in an air oven at 165° C. for 3.3 minutes, followed by a scour at the boil. The treated fabric is no longer soluble in 90% formic acid (unlike control nylon), and in addition has both dry and wet crease recovery increased from 60–70% for control to 85–90% for the grafted, crosslinked product.

In preparing the product of this invention, it is important to avoid the use of high concentrations of initiator; these high initiator concentrations tend to discolor polyamide substrates, and may at times produce a surface modification resulting in a smaller overall weight gain. It is unnecessary, and in fact may be undesirable to completely purge the system of oxygen. The preferred method is to permit the vinyl amide monomer, combined with the initiator, to penetrate into the polymer substrate before initiating polymerization uniformly throughout the polymer substrate.

Example 19

Nylon fabric samples are treated in accord with the following processes:

(a) A swatch of nylon fabric is soaked in an aqueous solution containing 10% methacrylamide and 2% ammonium persulfate for 30 to 60 minutes at room temperature. The fabric is then squeezed to remove excess liquid. The wet sample is placed in a water jacketed vessel at 30° C.; air is swept from the vessel by means of SO₂ for a period of 2 hours.

(b) A nylon fabric sample is soaked for 30 to 60 minutes in an aqueous solution containing 10% methacrylamide, 0.1% ammonium persulfate. After the soaking period, excess liquid is squeezed from the fabric. The wet fabric is then placed between sheets of aluminum foil and is heated at 130 to 150° C. for 5 minutes.

After the grafting treatment, all samples are subjected to 2 rinses in distilled water, followed by 10 standard "Tide" washes. The weight gains are then determined, and are listed in Table 12.

TABLE 12

| Sample | Treatment | Amide used | Weight gain, percent |
|---|---|---|---|
| EA | a | methacrylamide | 1.7 |
| EB | b | do | 9.7 |

When the samples are dyed as in Example 1, EA shows negligible improvement over an unmodified control, whereas EB dyes rapidly to deep shades.

When N-vinyl pyrrolidone is substituted for methacrylamide in treatment "a" above, no weight gain is observed, whereas following treatment "b" a measurable weight gain of 5.9% is obtained.

Example 20

The presence of water is also important in increasing the efficiency of the grafting operation when N-vinylpyrrolidone is combined with another monomer, for example vinyl pyridine, for improving acid dyeability. This is shown by the following example.

Polyhexamethylene adipamide flake containing no TiO₂ is cut to pass an 80 mesh sieve, and is then mixed in a rotating drum with 0.2% benzophenone for a period of 10 hours. The flake coated with the benzophenone is then spun to yarn using conventional processing conditions. The yarn is drawn 4×, producing a 40 denier, 13 filament product. This yarn is then knitted into tubing after plying. Five portions of this tubing, coded FA to FE, are irradiated using a Hanovia type H-85-C-3 ultraviolet mercury arc lamp. This lamp has an output of 500 watts, and produces about 100 watts of radiation in the ultraviolet below 4000 A. The lamp is equipped with a reflector, so that a large proportion of the output is directed onto the fabric sample. The samples are placed 15 cm. from the lamp, and each is irradiated for 7 minutes on each side (required because the knit tubing fabrics are of double thickness). Immediately following the irradiation, each sample (excepting the control, FA) is soaked in the solutions indicated in Table 13, for a period of three hours at 60° C. During this soaking, oxygen is removed from the soaking vessel by purging with helium. Ungrafted monomer and homopolymer are removed by scouring in "Tide" solution, after which the samples are dried and the weight gain determined, as indicated in Table 13.

The samples are then tested for dyeability, using a dye bath of the following composition (quantities based on one gram of fabric): 0.03 gram of 1-amino, 4-anilino, 2-anthraquinone sulfonic acid, 40 grams of water, 0.03 gram of glacial acetic acid, and 0.1 gram of ammonium sulfate. Each swatch of fabric is placed in the dyebath at 25° C., which is then heated to 100° C. over a period of 18 minutes; thereafter it is boiled for 2 minutes, then rinsed and examined. The improvement in dyeability obtained is indicated numerically in Table 13.

TABLE 13

| Sample | Treating composition, gms. | | | Percent H₂O | Wt. gain, percent | Dyeability [3] |
|---|---|---|---|---|---|---|
| | NVP [1] | VP [2] | H₂O | | | |
| FA | 0.0 | 0.0 | 0.0 | 0.0 | 0.0 | 1 |
| FB | 25.0 | 25.0 | 0.0 | 0.0 | −0.2 (loss) | 1 |
| FC | 24.75 | 24.75 | 0.5 | 1.0 | 1.4 | 4 |
| FD | 24.5 | 24.5 | 1.0 | 2.0 | 2.3 | 4 |
| FE | 24.0 | 24.0 | 2.0 | 4.0 | 39.1 | 10 |

[1] NVP=N-vinylpyrrolidone.
[2] VP=4-vinyl pyridine.
[3] Dyeability rated as in Table 7.

An examination of the data in Table 13 shows that in order to attain a significant improvement in dyeability the treating composition should contain over 2% water. When the treating composition contains 4% water, a greatly increased amount of the modifier is grafted.

Example 21

A nylon fabric sample is prepared to contain 17% (weight gain) of grafted N-vinylpyrrolidone by soaking a fabric swatch overnight in a 10% aqueous N-vinylpyrrolidone solution, followed by irradiation to a dose of 3 mrep. Portions of the test fabric with grafted N-vinylpyrrolidone are subjected to a laboratory test for laundry soiling, along with swatches of the original unmodified fabric as a control.

Samples are scoured, soiled, washed, soiled, the percent light reflectance determined ("before washing"), washed and the reflectance again determined ("after washing"). Low values indicate dirty samples.

Samples are scoured in water containing ½% by weight "Tide" and ½% by weight trisodium phosphate at 60° C. with continuous stirring, then rinsed; the scour and rinse is repeated, and the samples are soiled by placing in a pint "Launder-Ometer" jar containing 100¼" diameter steel balls, and the appropriate soil. For the oily soil test, corresponding to soil from the skin and to soil from grease and oils, 1 ml. of Wagg oil (R. E. Wagg, "J. Tex. Inst.," 1952, T–515) is added and is deposited uniformly within the jar, while the CCl$_4$ is evaporated. The fabric samples are placed in the jar, which is then tumbled for about 10 minutes at 70° F. The light reflectance of the samples is then determined (results in Table 14). The samples are then washed for 20 minutes at 37° C. in the Launder-Ometer, using 200 ml. distilled water containing ¼% "Tide" and 50¼" diameter steel balls. The washed samples are then rinsed, dried, and the reflectance again determined, with the results given in Table 14.

The test is repeated, replacing the Wagg oil with Saunders-Lambert dry soil (Saunders et al., "J. Am. Oil Chem. Soc." 5, 153–15 1950), which is representative of soil found in vacuum cleaners, and on bench tops, floors, etc. One hundred mgm. of the soil is placed in the jar, and the soil cycle is 45 minutes.

TABLE 14

| Sample | Wagg oily soil | | | Lambert dry soil | | |
|---|---|---|---|---|---|---|
| | Before wash | After wash | DR | Before wash | After wash | DR |
| Test | 46.1 | 79.1 | 33.0 | 27.1 | 64.1 | 37.0 |
| Control | 29.4 | 35.0 | 5.6 | 25.4 | 64.6 | 39.2 |

An examination of the reflectances reported in Table 14 and the differences in reflectance ("DR"), indicates that there is a significant decrease in oily soil pickup and a significant improvement in oily soil removal by the test fabric bearing the grafted N-vinylpyrrolidone. Smaller effects are produced with respect to the dry soil, but the significance in these data is that almost invariably any changes which improve oily soil pickup and removal will result in greatly increased tendency to acquire and retain dry soil. Treatment according to the process of this invention avoids this difficulty.

*Example 22*

Fifty grams of 80 mesh, 39 relative viscosity 66 nylon flake is blended with 25 grams of commercial N-vinylpyrrolidone in a glass test tube provided with an efficient stirrer and a heating jacket. The monomer and polymer are mixed thoroughly at 25° C., then the tube is evacuated and purged with nitrogen ten times. The reaction mixture is heated to a temperature of 282° C., which melts the polymer. Grafting occurs during the heat treatment. A blanket of nitrogen is maintained during the processing; stirring is started as soon as possible after the polymer becomes molten. The melt blending process continues for 45 minutes. The polymer mass is then cooled, ground and is extracted with water in a Soxhlet extractor for 24 hours. The graft copolymer is found to contain 19.8% of unextractable, grafted poly-N-vinylpyrrolidone. The graft copolymer is melt spun at a temperature of 277° C., using a screw extruder, to form a 5 filament yarn. The yarn is drawn 4× over a pin heated to 180° C. followed by a plate (in tandem) heated to 120° C., as shown by Hume in U.S. Patent 2,533,013. When the yarn is dyed, using the procedure and dye of Example 20, the fibers are found to be deeply dyeable.

Examination of transverse and longitudinal cross-sections of the fiber show a completely homogeneous and non-spherulitic filament structure. The fiber crystallinity is high, as indicated by X-ray diffraction studies.

While the product of the above example is clearly within the scope of our invention in its broader aspects as defined by the generic claims of the subjoined group, the specific mode of operation indicated in Example 22 above, i.e. the feature of heating together the substrate and grafting agent in the absence of free-radical initiators to a temperature which produces a melt, is the invention of Otto Jack Matray and is described more fully and claimed by him in copending application Ser. No. 785,793, filed January 9, 1959, and owned by the same assignee.

Somewhat increased utilization of N-vinylpyrrolidone is obtained when the thermally grafted flake is irradiated prior to the extraction step. As an illustration, the grafted polymer powder (prepared above), prior to extraction, is irradiated at 100° C. for a total dose of 3 mrep., using 2 mev. electrons. Following the extraction step, the polyvinylpyrrolidone content is found to be 29.2%. This polymer is melt spun as before at a temperature of 272° C. and drawn 4×. This yarn is also deeply dyeable, non-spherulitic, and highly crystalline. Fabrics prepared from both these yarns show properties which correspond to those obtained by applying N-vinylpyrrolidone monomer to nylon fabric, followed by irradiation.

*High energy radiation.*—Relatively small radiation doses are required to initiate the grafting reaction. Thus, for polymerizable vinyl amides and readily graftable polymers such as polyhexamethylene adipamide, a dose as small as about 0.005 mrep. will initiate significant amount of grafting. For less readily graftable compounds, such as those which are not homopolymerizable, doses of about 0.1 mrep. are recommended. Doses lower than 0.005 mrep. may be employed with freshly-distilled, inhibitor-free monomer, when the irradiation is carried out in the complete absence of oxygen; these conditions are usually unnecessary and unduly expensive to attain, and it is usually preferable to employ the higher dose indicated above.

In general, increased amounts of grafting are obtained with higher radiation doses; obviously doses so large that they tend to degrade the polymer are to be avoided. In general, a dosage significantly above about 100 mrep. is unnecessary.

*Use of chemical initiators.*—Chemical initiators are effective in producing the graft copolymer product of the present invention. A wide variety of conventional free radical initiators may be used. Such initiators include the peroxy compounds, i.e., compounds which contain the —O—O— grouping, e.g., diacyl peroxides such as diacetyl peroxide, peroxy acids such as performic or peracetic acid, dibutyryl peroxide, dipropionyl peroxide, dibenzoyl peroxide, and dialkyl peroxides such as dimethyl, diethyl, and dipropyl peroxides or per salts such as ammonium and alkali metal persulfates, perborates and percarbonates, etc. Other free radical forming initiators which may be used include the azines, e.g., benzalazine, diphenylketazine, etc., and the azo initiators such as α,α'-azo-diisobutyroamidine. The preferred initiators are those which are water soluble, since it is desirable that they be consolute with the unsaturated organic amide. Thus, the persulfates, and especially ammonium persulfate are preferred.

Low initiator concentrations increase the efficiency of grafting, and hence are preferred. In addition, high initiator concentrations (e.g., 1 to 2% ammonium persulfate) tend to yellow the nylon, making it unsuitable for some uses. Therefore, when an added initiator such as ammonium persulfate is used, concentrations of from about 0.005 to about 0.5% are recommended, with 0.01 to 0.2% as a preferred range.

Although as demonstrated in the examples, the use of an added chemical polymerization initiator is not essential in the present process, nevertheless such an agent may be used provided it is applied in such manner to permit uniform polymerization and grafting throughout the penetrated body. While applicants do not wish to be bound by any theory of operation, it is postulated that non-uniform polymerization initiation, for instance, by applying chemical initiator to the surface of an amide-penetrated structure, leads to "skin formation" that inhibits polymerization of the deep-seated amide. Thus, where a chemical initiator is used in accordance with the present invention, one method is to apply it in admixture with the vinyl amide under non-polymerizing conditions.

*Thermal initiation.*—It is usually desirable to heat the polymerizable composition in contact with the nitrogenous condensation polymer substrate rapidly to the polymerizing temperature, which improves grafting efficiency and decreases losses of amide. The temperature to be used in the polymerizing step will usually be above 60° C. and preferably above 100° C. The upper limit is set by the volatility or decomposition temperature of the unsaturated amide. With amides of good thermal stability (e.g., N-vinylpyrrolidone), polymer flake may be soaked in a solution of the amide, and the flake subsequently melted and spun, whereby grafting takes place simultaneously. Higher temperatures are more effective in producing a product with good crease recovery.

*Ultraviolet initiation.*—Ultraviolet light suitable for use in this invention includes light with wave lengths in the range of 1500–4000 A. Within this range, more effective grafting is obtained with light in the range of 2000–3800 A. and the most efficient grafting is obtained with light in the range of 2500–3500 A. Ultraviolet light suitable for use in this invention is characterized by having a radiation intensity of at least $4 \times 10^{-3}$ watts/cm.$^2$ of plane surface, upon which effective radiation impinges. Light with lower radiation intensity than this fails to cause grafting within a practical length of time.

The presence of a photoinitiator is not essential to the process of this invention. However, the use of a photoinitiator greatly reduces the ultraviolet light exposure required to bring about grafting. Since some nitrogen-containing polymers are somewhat degraded by excessive exposure to ultraviolet light, the use of a photoinitiator with resultant minimizing of ultraviolet exposure represents the preferred method of ultraviolet initiation. The amount of photoinitiator may be suitably varied from 0.01% to 10% of the weight of the polymerizable unsaturated amide to be grafted and amounts above and below this range may be employed under special circumstances.

Photoinitiators suitable for use in this invention are the initiators for addition polymerization which are activated by ultraviolet light. Suitable photoinitiators for use in this invention include vicinal dicarbonyl compounds, such as diacetyl, benzil, 2,3-pentanedione, 2,3-octanedione, 1-phenyl-1,2-butanedione, 2,2-dimethyl-4-phenyl-3,4-butanedione, phenylglyoxal, diphenyl triketone, etc.; aromatic diketones, such as anthraquinone; acyloins, such as benzoin and pivaloin; acyloin ethers, such as benzoin methyl ether, benzoin ethyl ether; α-hydrocarbon-substituted aromatic acyloins, including α-methylbenzoin, α-allyl-benzoin and α-phenylbenzoin; diaryl ketones, such as benzophenone and dinaphthyl ketone and organic disulfides such as diphenyldisulfide.

*Polymer substrates.*—Although any synthetic linear, high molecular weight, fiber- or film-forming, nitrogenous organic condensation polymer is suitable for preparing the product of this invention, polyamides are preferred. Suitable polyamides are those synthetic linear polyamides which are prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least one aliphatic —HCR— group in each repeating unit of the polymer molecule wherein —R— is a member of the class consisting of hydrogen, halogen, monovalent organic radical, alkylene or the like. Typical of such polyamides are those formed from an aliphatic diamine and an aliphatic acid and containing the repeating unit werein —X— and —Y— represent divalent aliphatic or cycloaliphatic groups and —Z— represents the linkage. Polyhexamethylene adipamide and caproamide (i.e. "66" and "6" nylons) are typical. Other suitable polyamides are those having the repeating structure wherein —A— is a divalent aromatic radical and —X— and —Z— are as previously defined. Polyhexamethylene terephthalamide is illustrative of such polymers. Additionally polyamides having repeating units such as and wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid and the like. Copolyamides, condensation copolymers wherein the amide linkage is the predominant linkage and polyamide mixtures are also useful. As pointed out previously, such polyamides, to form the structures of the present invention, are of a high molecular weight (i.e., they are fiber-forming and have a non-tacky surface at room temperature). Preparation of the high molecular weight polyamides is illustrated in U.S. Patent Nos. 2,071,250, 2,071,253 and 2,130,948. Preparation of polyurethanes is described in U.S. Patent Nos. 2,284,637 and 2,731,446; preparation of the polyureas is described in British Patent No. 535,139. Additional methods of preparation are described in U.S. Patent Nos. 2,831,834 and 2,708,617.

*Substrate shape.*—The shaped structure useful in forming the product of the present invention may be in any form such as a fiber, film, sponge or pellicle. It may be in the form of a woven, knitted or felted fabric, a paper, a bristle, a fibrid or artificial straw. Alternatively, the structure may be a flake, powder, or comminuted particle, which may be reshaped after grafting to form an article of specific end use. The shape is not a critical element in the treatment, except that shapes of increased thickness require a proportionately greater time or higher temperature or pressure for complete diffusion of the unsaturated amide to occur. If limited penetration is desired, or if the vinyl amide has been previously dispersed in the polymer matrix prior to grafting, thickness of the shaped structure is not of importance in determining process details. It is merely sufficient that when irradiation is employed to effect grafting, it has enough penetration to activate the substrate at least to the maximum depth required to effect the desired grafting of amide to the shaped polymer.

*Suitable unsaturated amides.*—By an unsaturated amide as used herein is meant any amide which contains at least one reactive aliphatic unsaturated bond. It is preferred that said amide be of relatively low molecular weight, since it is desirable that the amide penetrate into the shaped article and low molecular weight amides more readily penetrate the polymer structure. Thus, amides with up to 6 carbon atoms are preferred. However, amides with 8 or more carbons are useful in producing a surface concentrated effect. It is also desirable that the unsaturated amide by hydrophilic. Especially suitable amides are those which form water-soluble homopolymers. In general, those unsaturated amides containing benzene rings are not sufficiently hydrophilic to be highly useful in preparing the product of this invention. Suitable unsaturated amides are acrylamide, methacrylamide, N-methylolacrylamide, ethylacrylamide, vinylsulfonamides, vinylureas and the like. The preferred classes of compounds are N-alkyl-N-vinyl formamides such as N-methyl-N-vinyl formamide, and especially N-vinyl lactams (substituted and unsubstituted) such as N-vinyl butyrolactam (e.g., N-vinylpyrrolidone), methyl-substituted N-vinyl butyrolactam and N-vinyl valerolactam due to (a) their stability at high temperature, (b) the resistance of textiles prepared from polymers containing them to yellowing, particularly when heat treated, and (c) their ease of application due to their low toxicity. N-vinyl caprolactam is somewhat less effective than the N-vinyl-pyrrolidone.

It is obviously within the scope of this invention to form a graft copolymer with an unsaturated amide which may contain substituent groups in addition to amide which it may be desirable to attach to the polymer to confer other properties, such as enhanced static reduction, moisture repellence, resilience, dyeability, flameproofness, etc. N-methylolacrylamide is such a material. The "additional" substituent groups may also be introduced by cografting suitable monomers with the amide. Such techniques often provide a highly useful product, even when the cograft contains less than 4% of the amide, as in Example 7. The use of mixtures of unsaturated amides as well as the penetration and grafting of one amide followed by the penetration and grafting of other amides are obvious technique modifications. In some cases, chains of polymeric vinyl amide may be grafted to the polymer substrate, as shown in Example 15.

*Method of adding amide.*—If the unsaturated amide is stable at the polymer melting temperature, it may be added to the melt before shaping, or it can be added to a polymer solution, and shaping may then take place by wet or dry spinning after which the shaped filament may be irradiated to induce grafting. Alternatively, a polyamide, for example, with the unsaturated amide grafted thereto in flake form, may in some cases be melt spun to form filaments of the grafted copolymer. This process, shown in Example 9, is preferred for radiation-grafting N-vinylpyrrolidone to nylon. Another preferred process, since it avoids the need for using costly irradiation equipment, is the melt-grafting process of Example 22.

For flake with grafted amides which are not sufficiently heat stable, wet or dry spinning is satisfactory.

*Structure of product.*—The product of this invention is of the type known as a graft copolymer. Conventional copolymers, consisting of monomer species A and B, have a random distribution along the backbone of the polymer molecule, and may be represented schematically thus:

—AAABBABBBABAA—

The copolymer species with which this invention is concerned, is that of graft copolymers. Such copolymers consist of a main chain of polymer A, and side chains of polymer B grafted thereto, represented below:

When monomer B is not homopolymerizable, and when there is no other monomer species B present to copolymerize with B, then the above structure will contain single —B— units grafted to the A polymer backbone.

The characteristic of this copolymer type is that most of its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types is discussed in a comprehensive review article by E. H. Immergut and H. Mark in Macromolekulare Chimie 18/19, 322–341 (1956).

*Site of attachment of grafted amide.*—A study of the free radicals formed when poly(hexamethylene adipamide) is irradiated, has shown that hydrogen is removed from one of the carbons in the polymer chain, forming a free radical. Paramagnetic resonance studies indicate that the predominant free radical has the structure:

The formation of lesser numbers of free radical sites on other carbon atoms in the polymer chain have been indicated. No evidence has been uncovered which indicates the formation of a free radical and subsequent grafting via the nitrogen atom or the carbonyl group. This has been confirmed by paramagnetic resonance studies upon 1010 polyamide (prepared from sebacic acid and decamethylene diamine) completely deuterated in the alpha position which indicated that a free radical was formed by elimination of D from the alpha carbon. The use of paramagnetic resonance spectra to study free radicals is reviewed by G. F. Fraenkel in Annals of the New York Academy of Science 67, 546 (1957, May).

*Amount of modifier required.*—To attain useful modification of the synthetic linear nitrogenous condensation polymer by the grafting of unsaturated amides thereto, it is desirable that at least 4% and preferably at least 6% of the amide, based on weight of unmodified substrate, be incorporated. This amount of amide provides greatly improved dyeing rate and depth of shade, although larger amounts of amide give still further improvement in rate. For example, a true black can be obtained when 6% amide is grafted to the fiber, whereas reddish shades are obtained with lesser fiber modification.

Preferably in the practice of this invention, sufficient amide is grafted to the polymer substrate so that both improved dyeability and crepeability are obtained. Small amounts of amide (e.g. less than about 5%) may not increase or may even decrease crepeability (although dyeability is improved), as compared to unmodified yarn. Generally at least about 6%, and preferably at least about 8% of grafted amide avoids the decrease in crepeability. Larger amounts are even more effective. This product, as a low- or producer-twist yarn is permanently set by exposure to steam (or water under pressure) above 100° C., twisted to a high twist, and is then set (temporarily) a second time by a dry heat treatment (100–130° C.) to give a yarn with reduced twist liveliness which can be readily woven, e.g. as filling yarn. After weaving, the fabric is boiled off, and the yarn attempts to return to its original untwisted configuration, causing the fabric to retract to give true crepe. The crepe so produced is highly uniform. It is believed that the higher moisture regain obtained when at least about 6% amide is grafted to the fiber is important in imparting crepeability to the yarn and uniformity to the fabric; this high regain increases the dimensional changes of the yarn when the humidity changes, such as in laundering and drying operations. The exceptionally high wet crease recovery of woven fabrics modified with grafted amide is probably also related to these changes in moisture sensitivity of the fiber structure.

The upper limit for fibers is that at which the fiber disintegrates, either in handling or in washing. Usually up to about 100% amide (e.g., a graft copolymer in which the grafted amide component constitutes 50% of the whole) will not exceed this limit. The preferred range is, however, from 6% to about 50% grafted amide.

Since the maximum amount of amide which can be grafted to any substrate is limited to that amount of the amide which dissolves (penetrates) in the substrate at the soaking temperature, provided, of course, that excess reagent is removed prior to initiating grafting, special techniques are often desirable to graft the required amount of amide monomer. This can be done (a) by soaking the substrate in the amide at higher temperature, prior to grafting, thus taking advantage of the increased solubility; (b) by initiating grafting (thermally or by irradiation) in an excess of the reagent, or (c) repeating the soaking and grafting steps.

*Control of penetration.*—Because the polymer is penetrated with an unsaturated amide prior to initiating the graft polymerization, modification of the shaped structure extends at least through a substantial proportion of the body of the final product. Usually the amide is coated upon the shaped polymer, or padded on as a dispersion, a solution, a pure liquid, or as an emulsion. For liquids, spraying is useful, or the polymeric article may be dipped therein. The amide may be added as a vapor. The preferred method is to dip the shaped polymer into an aqueous solution which contains the polymerizable composition. Application in the presence of at least 4% $H_2O$ is especially beneficial.

Increased contact time and agitation are helpful in increasing penetration. It is sometimes beneficial to carry out the soaking for penetration at elevated temperatures (below that at which polymerization is initiated), at superatmospheric pressure or in the presence of swelling agents, dye carriers or the like. Minor amounts of wetting agents, surface active compounds and the like are useful for improving penetration efficiency.

When it is desirable to limit penetration of the polymerizable composition to a zone near the fiber surface, this may be accomplished by reduced contact time or temperature (before polymerizing), use of amides of greater chain length, or by using a lower concentration of the amide. Alternatively, the shaped substrate may be exposed to the polymerizable composition for the time required to effect the desired penetration, then penetration may be stopped by freezing, for example, by exposure to dry ice. The combination may then be irradiated while frozen.

Due to the grafting of the unsaturated amide, the polymer becomes highly receptive to a variety of dyes, as disclosed hereinabove. Cross-sections of a grafted nylon filament after dyeing were uniformly colored throughout the fiber, showing that the amide has penetrated into and grafted onto the fiber.

When experimental conditions are adjusted so that complete penetration does not occur, microscopic examination of the dyed filament cross-section shows a sharply defined ring which clearly defines the depth of penetration. For some purposes, limited penetration is desirable. Thus, it may be desirable to limit penetration to about 10% (measured on the fiber radius) or, in special cases, to as low as 5% penetration. Since the fiber diameter of 1 denier per filament nylon yarn is about 11 microns, satisfactory penetration, for the said special cases, is therefore about 0.3 micron. Similar considerations apply for more massive substrates, such as for example, heavy denier yarns, monofils, bristles, films and even for molded objects. Penetration (and grafting) to a depth of about 0.3 micron (measured normal to the surface) produces useful and durable modification of certain polymer properties, such as for example, antistatic effect. In cases of partial penetration, the composition preferred for the product of this invention refers to the penetrated zone, and not to the non-penetrated core. Results obtained by analysis of the entire filament must be corrected for the respective content of penetrated and non-penetrated fiber, which may be determined by measurement of the cross-section of the dyed filaments.

*Physical changes in substrate structure.*—The grafting of the unsaturated amide to the shaped nitrogenous condensation polymer appears to produce fundamental physical changes in the polymer. It is believed that there is an opening of the fiber structure, so that it becomes more porous. This opening of the structure does not accompany the grafting reaction, but occurs during subsequent boil-off or steam treatment, presumably resulting in hydration of the grafted amide. The open structure permits ready penetration of the fiber by dyes or other treating agents of large molecular size (e.g., resin finishing agents, antistatic agents, or the like). Production of the open structure appears to set the filaments irreversibly in their shapes at the time of treatment, whereby a variety of interesting and useful effects are produced. For example, if a fabric of amide-grafted polyamide is creased and treated with water or steam under pressure above 100° C. in that condition, a permanent crease will be produced. Although this fabric may be subsequently ironed (flat) so that the crease disappears, when wetted the crease immediately reappears, remaining after the fabric dries. Thus, fabrics treated according to the processes disclosed herein, after becoming wrinkled through use, can be brought back to their original wrinkle-free appearance by merely wetting and hanging up to dry. Intentional creases which are produced by the initial setting operation will remain as originally intended, in spite of damp weather, showers, laundering, etc.

The ability of the product of the invention to acquire a permanent set on boil-off under pressure above 100° C. following the grafting of the unsaturated amide, may be utilized in preparing a variety of novel yarn products. For example, a yarn with unsaturated amide grafted thereto may be knit into tubing and thereafter may be steam-set above 100° C. (or boiled off under pressure above 100° C.). This step sets the stitch formation, so that even though an apparently uncrimped yarn is obtained when the yarn is unravelled, dry heat-set and backwound onto cones, when immersed in water it immediately snaps into a crimp and remains crimped on drying. A bulky and elastic product is formed when the thustreated yarn is converted to fabric.

The amide-grafted nylon yarn of this invention may alternatively be highly twisted (e.g., 30 turns per inch), boiled off (under pressure) to set the twist, and then backtwisted and dry heat-set at low twist. This yarn is stable and uncrimped until immersed in water, whereupon a highly crimped yarn is produced. Alternatively, a true crepe fabric may be produced by boiling off under pressure or steaming above 100° C. the amide-grafted nylon yarn prior to twisting, thus setting the structure, and thereafter twisting to about 50 turns per inch. The twisted yarn is then twist-set under commercial conditions and subsequently woven into a fabric. On immersing the fabric in water, a crepe fabric is produced.

In addition to the high moisture regain, high wet crease recovery, and hydrophilic properties of the product of this invention which have been disclosed hereinabove, the product of this invention has a minimum tendency to retain static charges, thus making for improved comfort under conditions of low humidity. In addition, it is resistant to the pickup of oily soil, and any soil so acquired is more easily removed by washing, it has a high degree of oxidative stability in that it resists light degradation (type of oxidation), and has better strength retention during conventional bleaching procedures. The product also shows a desirable reactivity to a variety of after-treatments, whereby new or impoved properties are obtained. For example, a highly resilient fabric is produced by cross-linking nylon with grafted methylolacrylamide; a germicidal product is produced by forming an iodine complex by treating the N-vinylpyrrolidone-grafted substrate with iodine.

This application is a continuation-in-part of now abandoned United States application Nos. 499,754, filed April 6, 1955, 503,790, filed April 25, 1955, and 693,558, filed October 31, 1957.

Many modifications of the above described invention will be apparent to those skilled in the art from a reading of the above without a departure from the inventive concept.

We claim:

1. A shaped structure of a graft copolymer of fiber-forming molecular weight comprising (1) a high molecular weight, synthetic linear polymer from the class consisting of a polyamide, a polyurethane, a polyurea and a polysulfonamide wherein the amido groups of the recurring interunit linkages are an integral part of the polymer chain and (2) graft copolymerized thereto, from at least 4 to about 200 weight percentage, based on the weight of the original linear polymer, of substantially linear hydrocarbon side chains, each side chain being attached by a single carbon-to-carbon bond to a catenarian carbon of the said linear polymer, each said side chain bearing as substituents for hydrogen radicals from the class consisting of (a) amido radicals bonded to the said side chain through carbonyl carbon, (b) amido radicals bonded to the said side chain through amide nitrogen, and (c) lactam radicals bonded to the said side chain through lactam nitrogen, with the proviso that any of the said substituents (a), (b) and (c) has a maximum carbon atom content of 6 and with the further proviso that there be at least one of the said substituents (a), (b) and (c) for every nine carbon atoms in the said side chains and being at least one carbon atom removed from the carbon atom of the said side chain which is linked to the said catenarian carbon.

2. The structure of claim 1 wherein the said substituents (a), (b) and (c) are members of the class consisting of and wherein $R_1$, $R_2$ and $R_3$ are members of the class consisting of hydrogen and lower aliphatic, $R_4$ is a member of the class consisting of hydrogen and $-NR_1R_2$, $R_5$ is a member of the class consisting of hydrogen and lower alkyl and $n$ is an integer between 2 and 6.

3. The structure of claim 1 wherein the grafted side chains are distributed throughout the bulk of the shaped article.

4. The structure of claim 1 wherein the grafted side chains are present only near the surface of the said structure.

5. The structure of claim 1 wherein the said linear polymer is a polyamide.

6. The structure of claim 1, wherein the side chains consist of polymerized N-vinylpyrrolidone.

7. The structure of claim 1, wherein the side chains consist of polymerized N-methyl-N-vinyl-formamide.

8. A process for producing the product of claim 1 which comprises intimately contacting (a) a shaped structure of high molecular weight synthetic linear polymer free of free-radical initiating peroxy sites from the class consisting of a polyamide, a polyurethane, a polyurea and a polysulfonamide wherein the amido groups of the recurring interunit linkages are an integral part of the polymer chain and (b) a fluid amide containing less than 9 carbon atoms and a single reactive aliphatic unsaturated bond until the said fluid has penetrated at least about 5% of the cross-sectional area of the said shaped structure, and heating the resulting mass in the presence of a free-radical initiator.

References Cited in the file of this patent

UNITED STATES PATENTS

| 2,123,599 | Fikentscher et al. | July 12, 1938 |
| 2,548,520 | Damschroder et al. | Apr. 10, 1951 |
| 2,794,793 | Coover | June 4, 1957 |
| 2,831,767 | Dann et al. | Apr. 22, 1958 |
| 2,837,496 | Vandenberg | June 3, 1958 |
| 2,841,569 | Rugg et al. | July 1, 1958 |
| 2,849,419 | Hayes et al. | Aug. 26, 1958 |
| 2,863,812 | Graham | Dec. 9, 1958 |
| 2,878,174 | Rainer | Mar. 17, 1959 |
| 2,940,869 | Graham | June 14, 1960 |

FOREIGN PATENTS

| 613,817 | Great Britain | Dec. 3, 1948 |
| 679,562 | Great Britain | Sept. 17, 1952 |
| 767,912 | Great Britain | Feb. 6, 1957 |

OTHER REFERENCES

"Journal of Polymer Science," volume 8, pages 257, 261 (1952).

Morrell: "Synthetic Resins and Allied Plastics," 3rd edition, Oxford University Press, London (1951), pages 14 and 201.